(12) United States Patent
Guan et al.

(10) Patent No.: US 12,216,923 B2
(45) Date of Patent: Feb. 4, 2025

(54) COMPUTER SYSTEM, MEMORY EXPANSION DEVICE AND METHOD FOR USE IN COMPUTER SYSTEM

(71) Applicant: ALIBABA (CHINA) CO., LTD., Zhejiang Province (CN)

(72) Inventors: Yijin Guan, Beijing (CN); Tianchan Guan, Shanghai (CN); Dimin Niu, San Mateo, CA (US); Hongzhong Zheng, Los Gatos, CA (US)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 0 days.

(21) Appl. No.: 18/064,500

(22) Filed: Dec. 12, 2022

(65) Prior Publication Data
US 2024/0069755 A1    Feb. 29, 2024

(30) Foreign Application Priority Data
Aug. 31, 2022    (CN) .......................... 202211059501.8

(51) Int. Cl.
    G06F 13/00    (2006.01)
    G06F 1/16     (2006.01)
    G06F 3/06     (2006.01)
(52) U.S. Cl.
    CPC .......... *G06F 3/0622* (2013.01); *G06F 1/1632* (2013.01); *G06F 3/0607* (2013.01); *G06F 3/0632* (2013.01); *G06F 3/0683* (2013.01)

(58) Field of Classification Search
    CPC .... G06F 13/385; G06F 13/409; G06F 3/0611; G06F 3/0659; G06F 3/0664; G06F 3/0673; G06F 3/0688; G06F 13/1642; G06F 13/4036
    See application file for complete search history.

(56) References Cited

U.S. PATENT DOCUMENTS

| | | | |
|---|---|---|---|
| 2006/0134936 A1* | 6/2006 | Sullivan | G06F 13/409 439/61 |
| 2020/0344298 A1* | 10/2020 | Iyer | H04L 49/3072 |
| 2023/0112007 A1* | 4/2023 | Kalyanasundharam | H04L 49/15 711/154 |

* cited by examiner

Primary Examiner — Yong J Choe
(74) Attorney, Agent, or Firm — WPAT, P.C.; Anthony King

(57) ABSTRACT

The present application provides a computer system, a memory expansion device and a method for use in the computer system. The computer system includes multiple hosts and multiple memory expansion devices; the memory expansion devices correspond to the hosts in a one-to-one manner. Each host includes a CPU and a memory; each memory expansion device includes a first interface and multiple second interfaces. The first interface is configured to allow each memory expansion device to communicate with the corresponding CPU via a first coherence interconnection protocol, and the second interface is configured to allow each memory expansion device to communicate with a portion of memory expansion devices via a second coherence interconnection protocol. Any two memory expansion devices communicate with each other via at least two different paths, and the number of memory expansion devices that at least one of the two paths passes through is not more than one.

19 Claims, 5 Drawing Sheets

COMPUTER SYSTEM, MEMORY EXPANSION DEVICE AND METHOD FOR USE IN COMPUTER SYSTEM

CROSS-REFERENCE TO RELATED APPLICATIONS

This application claims priority to PRC Patent Application No. 202211059501.8 filed Aug. 31, 2022, which is incorporated herein by reference for all purposes.

TECHNICAL FIELD

The present application relates to a computer system, and particularly to a computer system that allows a plurality of hosts share a memory.

BACKGROUND

With the continuous development of network technology, the speed of network is increasing, which creates good conditions for the application of clustering system. Cluster systems can provide users with a large amount of central processing unit (CPU) and memory resources, but since each node in the cluster is still an autonomous individual, its memory resources cannot be shared and cannot be effectively utilized, making the memory resources of the cluster a serious waste.

Driven by this background, the shared memory model of accessing remote data through memory semantics makes a unified global memory abstraction attractive for distributed computation. However, when it comes to communication between remote hosts, existing transmission control protocol (TCP)/internet protocol (IP)-based memory sharing suffers from high latency and low data throughput, especially for 100 G+ Ethernet, where traditional TCP is difficult to drive the high bandwidth; in high-bandwidth scenarios, the protocol itself has high CPU usage, which takes up the computational resources required by the business logic itself and leads to performance shortage.

The existing memory sharing based on remote direct memory access (RDMA) can directly access remote memory without the remote CPU to improve CPU efficiency, but since memory and its memory interface (e.g., DDR) are designated as completely passive device modules, they cannot operate without the help of the host-side CPU and its memory controller; as more memory is added to the system, the number of other resources used in computation processes such as for holding remote memory increases, causing the cost to grow exponentially. Second, RDMA introduces redundant memory copies and software architectural interventions, which in turn makes the time to access remote memory (400-500 ns) several orders of magnitude longer than the time to access local DRAM (20 ns).

SUMMARY

Embodiments of the present disclosure are directed a computer system, characterized in including a plurality of hosts and a plurality of memory expansion devices, wherein the plurality of memory expansion devices correspond to the plurality of hosts in a one-to-one manner. Each host includes a CPU and a memory, and each memory expansion device includes a first interface and a plurality of second interfaces, wherein the first interface is configured to allow each memory expansion device to communicate with the corresponding CPU via a first coherence interconnection protocol, and the plurality of second interfaces are configured to allow each memory expansion device to communicate with a portion of memory expansion devices of the plurality of memory expansion devices via a second coherence interconnection protocol, wherein any two memory expansion devices of the plurality of memory expansion devices communicate with each other via at least two different paths, and the number of memory expansion devices that at least one of the two paths passes through is not more than one.

Embodiments of the present disclosure are directed a method for use in a computer system, characterized in the computer system including a plurality of hosts and a plurality of memory expansion devices, wherein each host includes a CPU and a memory, wherein the plurality of memory expansion devices correspond to the plurality of hosts in a one-to-one manner, and the method includes allowing each memory expansion device to communicate with the corresponding CPU via a first coherence interconnection protocol, and allow each memory expansion device to communicate with a portion of memory expansion devices of the plurality of memory expansion devices via a second coherence interconnection protocol, wherein any two memory expansion devices of the plurality of memory expansion devices communicate with each other via at least two different paths, and the number of memory expansion devices that at least one of the two paths passes through is not more than one.

Since the memory expansion device of the computer system according to the present disclosure communicates with the host via a first coherence interconnection protocol, and communicates with other memory expansion devices via at least two different paths, it allows the memory resource of the computer system to be shared, thereby increasing the utilization of memory resources and effectively avoiding the problem of single point of failure. Further, the plurality of memory expansion devices communicate with each other via the second coherence interconnection protocol, which effectively shorten the time that the CPU access the remote memory to about 80 ns, which is very close to the time that the CPU's access the local memory (about 20 ns), thereby achieving the effect of reducing the access latency.

BRIEF DESCRIPTION OF THE DRAWINGS

Aspects of the present disclosure are best understood from the following detailed description when read with the accompanying figures. It should be noted that, in accordance with the standard practice in the field, various structures are not drawn to scale. In fact, the dimensions of the various structures may be arbitrarily increased or reduced for the clarity of discussion.

DETAILED DESCRIPTION

Figure 1:
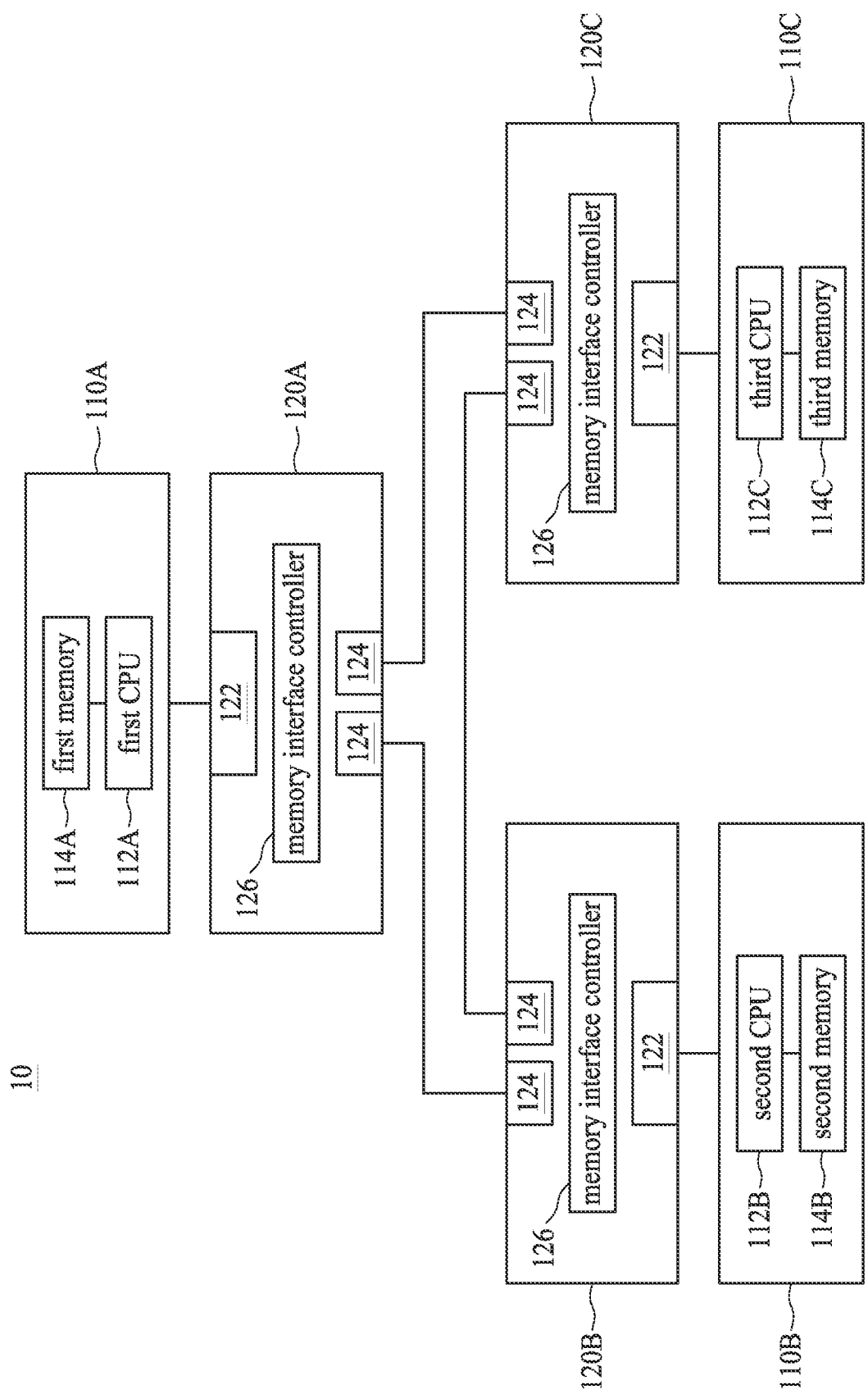
FIG. 1 is an architectural diagram illustrating a computer system according to a first embodiment of the present application.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in various examples. This repetition is for the purpose of simplicity and clarity and does not in itself dictate a relationship between the various embodiments and/or configurations discussed.

Moreover, spatially relative terms, such as "beneath," "below," "lower," "above," "upper", "on" and the like, may be used herein for ease of description to describe one element or feature's relationship to another element(s) or feature(s) as illustrated in the figures. These spatially relative terms are intended to encompass different orientations of the device in use or operation in addition to the orientation depicted in the drawings. The apparatus may be otherwise oriented (rotated 90 degrees or at other orientations) and the spatially relative descriptors used herein may likewise be interpreted accordingly.

As used herein, the terms such as "first", "second" and "third" describe various elements, components, regions, layers and/or sections, these elements, components, regions, layers and/or sections should not be limited by these terms. These terms may be only used to distinguish one element, component, region, layer or section from another. For example, the terms such as "first", "second" and "third" when used herein do not imply a sequence or order unless clearly indicated by the context.

As used herein, the singular forms "a," "an" and "the" are intended to include the plural forms as well, unless the context clearly indicates otherwise. The term "connect," and its derivatives, may be used herein to describe the structural relationship between components. The term "connected to" may be used to describe two or more components in direct physical or electrical contact with each other. The term "connected to" may also be used to indicate that two or more components are in direct or indirect (with intervening components therebetween) physical or electrical contact with each other, and/or that the two or more components collaborate or interact with each other.

Generally, the computer system includes a plurality of interconnected hosts, wherein each host can include a memory; when performing a task, the computer system uses a memory sharing mechanism to allocate the idle memory in the host to a host with a need of a memory for performing tasks; after the task is completed, the memory is released so that the computer system continues to allocate the memory to other tasks in need of a memory. However, the existing TCP/IP-based or RDMA-based memory sharing mechanism suffers from issues of high latency and low data throughput. The present application achieves the effect of reducing data transmission latency and increasing data throughput by allowing a plurality of hosts to communicate with a plurality of memory expansion devices in a one-to-one manner via a first coherence interconnection protocol and allowing the plurality of memory expansion devices to act as a bridge via a second coherence interconnection protocol. In this case, said first coherence interconnection protocol may be, for example, but not limited to, the CXL protocol; and said second coherence interconnection protocol may be, for example, but not limited to, the Ethernet protocol, the details of which are described below. For ease of discussion, in the following, the first coherence interconnection protocol is referred to as the CXL protocol and the second coherence interconnection protocol is referred to as the Ethernet protocol; however, those having ordinary knowledge in the of the related filed will recognize that this is only an illustrative example and is not intended to limit the present application.

FIG. 1 is an architectural diagram illustrating a computer system according to one embodiment of the present application. For ease of discussion, in the present embodiment, three sets of hosts and memory expansion devices are used as an example for discussion; however, the present application is not limited thereto. A computer system 10 includes a first host 110A, a second host 110B, a third host 110C, a first memory expansion device 120A, a second memory expansion device 120B and a third memory expansion device 120C; the first host 110A includes a first central processing unit (CPU) 112A and a first memory 114A, wherein the first memory 114A is connected to the first central processing unit 112A; the second host 110B includes a second central processing unit 112B and a second memory 114B, wherein the second memory 114B is connected to the second central processing unit 112B; the third host 110C includes a third central processing unit 112C and a third memory 114C, wherein the third memory 114C is connected to the third central processing unit 112C. The first memory 114A, the second memory 114B and the third memory 114C can respectively be a dynamic random access memory (DRAM).

The first memory expansion device 120A is connected to the first central processing unit 112A, the second memory expansion device 120B is connected to the second central processing unit 112B and the first memory expansion device 120A, the third memory expansion device 120C is connected to the third central processing unit 112C, the first memory expansion device 120A and the second memory expansion device 120B. Specifically, the first memory expansion device 120A, the second memory expansion device 120B and the third memory expansion device 120C all have the first interface 122, the plurality of second interfaces 124 and the memory interface controller 126; the first memory expansion device 120A is connected to the first central processing unit 112A via its own first interface 122 (e.g., the first memory expansion device 120A is coupled to first processing unit 112A via the first interface 122 inserted in the PCIe slot in the PCB), the second memory expansion device 120B is connected to the second central processing unit 112B via its own first interface 122, the third memory expansion device 120C is connected to the third central processing unit 112C via its own first interface 122, the plurality of second interfaces 124 of the first to third memory expansion devices 120A-120C can be connected via cables, and can communicate, for example, at a rate of 400 Gb per second; this means that the first to third memory expansion devices 120A-120C communicate with the corresponding first to third central processing units 110A-110C via the CXL protocol, whereas the first memory expansion device 120A, the second memory expansion device 120B, and the third memory expansion device 120C communicate with each other via the Ethernet protocol. With the CXL protocol, the difference in transmission performance between coarse and fine granularity in accessing remote memory can be reduced. In some embodiments, the first to third memory expansion devices 120A-120C can be implemented as field programmable gate arrays (FPGAs).

With the foregoing configuration, the first central processing unit 112A is capable of accessing not only the first memory 114A directly, but also the second memory 114B in the second host 110B and the third memory 114C in the third host 110C indirectly via the interconnected first to third memory expansion devices 120A-120C; in this way, when the first host 110A is allocated to a task and the remaining space in the first memory 114A is not sufficient for the currently allocated task, the first central processing unit 112A can perform the allocated task by accessing the idle space in the second memory 114B and/or the third memory 114C, preventing the problem that the first host 110A cannot operate due to insufficient resources in the first memory 114A, thereby improving system performance. Furthermore, any two of the first to third memory expansion devices 120A-120C communicate with each other via two different paths, for example, the first memory expansion device 120A can communicate directly with the second memory expansion device 120B, or it can communicate with the second memory expansion device 120B via the third memory expansion device 120C; therefore, even if any one of the memory expansion devices fails, it will not affect the communication between other memory expansion devices, thereby avoiding the single point of failure problem where the entire computer system 10 cannot work due to the failure of a single memory expansion device.

In the present embodiment, after the first host 110A receives a target task, the first central processing unit 112A sends a local memory access request to the first memory 114A based on the storage size required by the target task; after the first memory 114A receives the memory access request, the first memory 114A sends the usage condition of its own storage space to the first central processing unit 112A with a local reply message; the local reply message carries information about at least the size of the idle space in the first memory 114A and the physical address of said idle space. Because the first memory 114 is the memory used by the first central processing unit 112 in performing regular operations, the first central processing unit 112A completes the execution of the target task by accessing the first memory 114A in the case where the local reply message indicates the free space in the first memory 114 meets the storage size required for the target task. However, in the case where the local reply message indicates that there is no sufficient idle space in the first memory 114 to meet the storage size required for the target task, or directly by system configuration, the first central processing unit 110A may also issue a device memory access request to the first memory expansion device 120A.

The memory interface controller 126 in the first memory expansion device 120A converts the device memory access request from the first interface 122 into a remote device memory access request and sends it to the second memory expansion device 120B and the third memory expansion device 120C. The memory interface controller 126 in the second memory expansion device 120B converts the remote device memory access request from the second interface 124 into a host memory access request and sends it to the second host 110B, and the second host 110B may access the second memory 114B based on the host memory access request. Of course, the second memory expansion device 120B may also forward the remote device memory access request to the third memory expansion device 120C.

Figure 2:
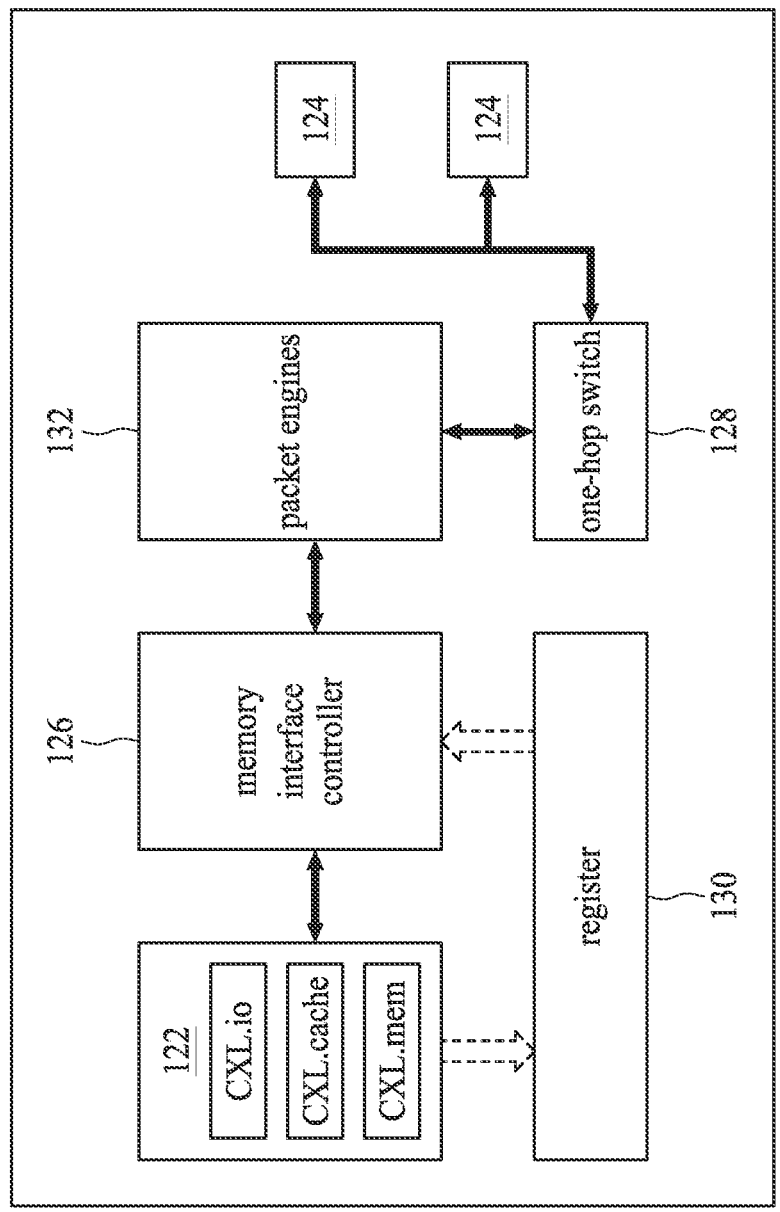
FIG. 2 is a schematic diagram illustrating a memory expansion device according to one embodiment of the present application.

Specifically, the first through third memory expansion devices 120A-120C are provided with one-hop switches 128, shown in FIG. 2, which is coupled between the plurality of second interfaces 124 and the memory interface controller 126 for determining to which memory expansion device in the computer system 10 the remote device memory access request is to be passed. For example, when the second memory expansion device 120B receives the remote device memory access request from the first memory expansion device 120A, the one-hop switch 128 in the second memory expansion device 120B determines, based on the information carried in the remote device memory access request, whether the remote device memory access request is to be sent to the host to which it is connected; if the remote device memory access request is intended for the second host 110B connected to the second memory expansion device 120B, the one-hop switch 128 receives the remote device memory access request and transmits it to its own memory interface controller 126. In contrast, if this remote device memory access request is not intended to be sent to the second host 110B connected to the second memory expansion device 120B, then the second memory expansion device 120B sends the remote device memory access request from the second interface 124 to the third memory expansion device 120C. The memory interface controller 126 in the third memory expansion device 120C may convert the remote device memory access request from the second interface 124 into a host memory access request and correspondingly send it to the third host 110C, which may access the third memory 114C based on the host memory access request.

After the second memory 114B or the third memory 114C receives the host memory access request, it will send its own memory space usage to the corresponding second memory expansion device 120B or third memory expansion device 120C with a host reply message; the host reply message carries at least the size of the idle space in the second memory 114A/third memory 114C and the physical address of the idle space. The first memory expansion device 120A receives the host reply message from the second memory expansion device 120B and the third memory expansion device 120C, and converts the host reply message into a device reply message readable by the first central processing unit 112A before passing it to the first central processing unit 112A. In this way, the first central processing unit 112A can learn from the local reply information and the device reply information whether there is idle space in the computer system 10 to meet the storage size required for the target task. Although there is no idle space in the first memory 114A that meets the target task requirement storage size, the size of the idle space in all the memories in the computer system 10 meets the target task requirement storage size, and the first central processing unit 112A can execute the target task by accessing the first memory 114A, the second memory 114B, and/or the third memory 114C. In other words, identifying the usage condition of the first to third memories 114A-114C is a prerequisite for memory sharing.

As discussed above, the first to third memory expansion devices 120A-120C communicate with the corresponding first to third central processing units 110A-110C via the CXL protocol, which includes three sub-protocols, the CXL.io sub-protocol, the CXL.mem sub-protocol, and the CXL.cache sub-protocol, which together facilitate the consistent sharing of memory resources among the first to third hosts 110A-110C. Specifically, the first through third central processing units 112A-112C can manage the corresponding first to third memory expansion devices 120A-120C via the CXL.io subprotocol. The first central processing unit 112A can send device memory access requests to the first memory expansion device 120A using the CXL.mem subprotocol, and the second memory expansion device 120B and the third memory expansion devices 120C may use the CXL.cache subprotocol to send host memory access requests to the corresponding second host 112A and third host 110B; the second host 112A and third host 110B may use the CXL.cache subprotocol to send host reply messages to the corresponding second memory expansion devices 120B and third memory expansion devices 120C to respond to the host memory access requests sent from the second memory expansion device 120B and the third memory expansion device 120C, and the first memory expansion device 120A may send a device reply message using the CXL.mem subprotocol to respond to the device memory access requests.

In certain embodiments, the first to third memory expansion device 120A-120C have a register 130, as shown in FIG. 2, configured to record the usage condition of the memory indicated in the host reply message. In one example, the memory expansion device connected to the central processing unit performing the target task records the usage condition of the memory indicated in the host reply message from the other memory expansion devices to facilitate dynamic, real-time allocation of memory space based on the target task requirements.

In general, the address used by the central processing unit is referred to as the logical address, whereas the address used by the memory is referred to as the physical address. In the present embodiment, although the second memory 114B and the third memory 114C are not the local memory of the first central processing unit 112A that performs the target task, the physical address of their idle space equals to the physical address of the local memory (i.e., the first memory 114A). In order to prevent the first central processing unit LI 2A from being unable to identify which memory the data generated by executing the target task is stored in, and thus increasing the execution time of the target task or even making it impossible to execute the target task, the memory interface controller 126 in the expansion device 120A connected to the first central processing unit 112A executing the target task may be used to process logical address-to-physical address mapping information and algorithms, so as to convert the physical address carried in the host reply message into become a logical address recognizable by the first central processing unit 112A upon receiving the host reply message from the second memory expansion device 120A and the third memory expansion device 120B. In this way, the first central processing unit 112A, which performs the target task, does not have to identify the remote memory, thereby reducing the workload. The memory interface controller 126 further records the one-to-one mapping relationship between the physical and logical addresses of each memory in the register 130.

During the execution of the target task, the memory interface controller 126 may convert a store/access request sent by the first central processing unit 112A using a logical address into a physical address readable by the second memory 114B and/or the third memory 114C for accessing the second memory 114B and/or the third memory 114C based on the mapping relationship. In the present embodiment, the packet engines 132 in the first to third memory expansion devices 120A-120C, are coupled between the memory interface controller 126 and the one-hop switch 128. When performing data storage, the packet engine 132 can parse and unpack one or more packets sent by the first central processing unit 112A and passed through the one-hop switch 128. When accessing the data, the packet engine 132 assembles the data from memory into packets and passes them via Ethernet to the first central processing unit 112A. The memory interface controllers 126 of the memory expansion devices 120A-120C may also include a near-memory processor that can perform operations on the data from remote memory according to the target task, such as multiplication and addition of data, to reduce the workload of the first central processing unit 112A. In one example, the near-memory processor may be an application-specific accelerator.

In the present embodiment, the second memory 114B and the third memory 114C may reserve the idle space therein for use as the storage space by other hosts in advance; of course, the system will also reserve the idle storage space in the first memory 114A in advance for use by the second host 110B and the third host 110C. In one example, in the computer system 10, such idle space pre-planned by the system for use by other hosts may have a fixed size; in such a case, it is feasible to prevent the computer system 10 from failing to perform certain urgent target tasks because of the limited memory resource, thereby ensuring the stable operation of computer system 10. In other examples, the idle space in the second memory 114B and the third memory 114C may be the remaining storage space not allocated for the first to third central processing units 112A-112C for executing other target tasks, and the size of these remaining storage spaces are dynamically adjusted as the performance and completion of other target tasks; this situation can significantly reduce the generation of storage fragments and improve the hardware utilization.

Figure 3:
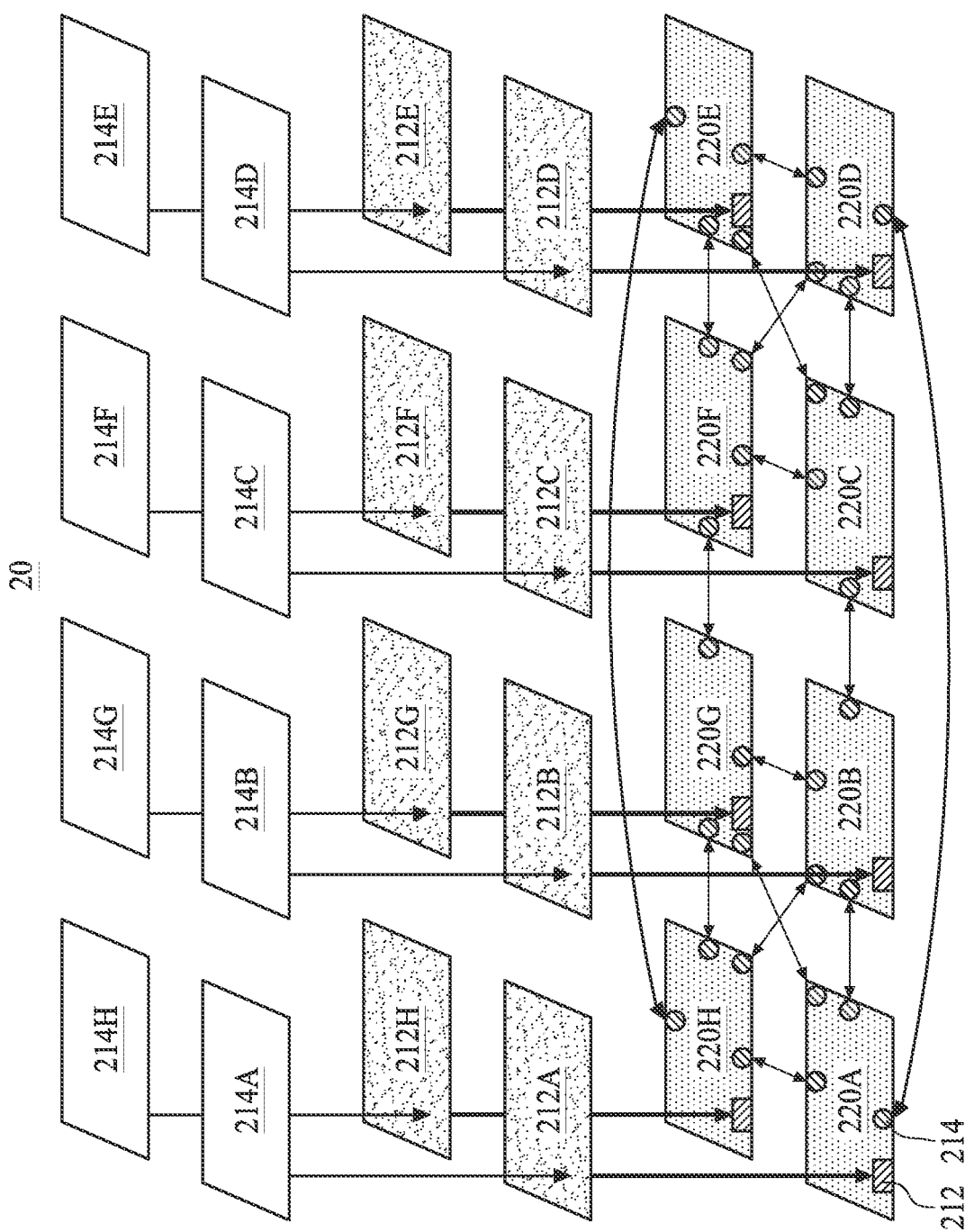
FIG. 3 is an architectural diagram illustrating a computer system according to a second embodiment of the present application.

In some server specifications, such as a rack-mounted server, a single rack may include eight hosts. For this specification, the present application provides a corresponding embodiment as shown in FIG. 3. FIG. 3 is an architectural diagram of a second embodiment of the computer system 20 of the present application. The computer system 20 may be a rack-mounted server and include a plurality of hosts 210A-210H and a plurality of memory expansion devices 220A-220H. The computer system 20 and the computer system 10 may operate according to similar principles. The difference between the computer system 20 and the computer system 10 is that the number of the second interfaces 224 of the memory expansion devices 220A-220H in the computer system 20 needs to be increased to allow any two memory expansion devices 224 to communicate with each other via two different paths, and the number of memory expansion devices 220A-220H through which at least one of the two paths passes is not more than one; whereby, all central processing units 212A-212A of the computer system 20 achieve full connectivity within one hop of memory expansion devices 220A-220H, and any one memory expansion device 220A-220H breaks down does not affect the communication and the efficiency of communication between the other memory expansion devices 220A-220H, thereby solving the problem of single point of failure.

Specifically, when the central processing units 212A-212H of the eight hosts 210A-210H in the computer system 20 are connected to the memory expansion devices 220A-220H in a one-to-one manner, then when each memory expansion device 220A-220H includes four second interfaces 224, it is possible for the memory expansion device 220A-220 connected to these eight hosts 210A-210H present in the same rack communicate with each other via two different paths, and at least one of these two paths passes through no more than one of the memory expansion devices 220A-220H. For example, the memory expansion device 220A may communicate with the memory expansion device 220D via a plurality of paths, and one of said plurality of paths may allow no more than one of memory expansion devices 220A-220H to be passed through, i.e., the memory expansion device 220A communicates directly with the memory expansion device 220D. In another example, the memory expansion device 220A may communicate with the memory expansion device 220E via a plurality of paths, and two of said plurality of paths may allow no more than one of memory expansion devices 220A-220H to be passed through, one of said two paths being the memory expansion device 220A communicates with the memory expansion device 220E via the memory expansion device 220D and the other being the memory expansion device 220A communicates with the memory expansion device 220E via the memory expansion device 220H; thus, even if the memory expansion device 220H fails, it will not affect the communication between the memory expansion device 220A and the memory expansion device 220E.

Communication between the memory expansion device 220A and the memory expansion device 220E can occur when the host 210A receives a target task, but the memory 214A in the host 210A does not have a storage space that meets the storage space required by the target task; in such a case, the central processing unit 212A in the host 210A will send a device memory access request using the CXL.mem subprotocol and the memory expansion device 220A converts the incoming device memory access request into a remote device memory access request and sends it to the memory expansion devices 220D and 220H via Ethernet; the memory expansion devices 220D and 220H, after determining that the aforementioned device memory access request is not an access to the hosts 210D and 210H to which they are connected, send the remote device memory access request to the memory expansion device 220E via Ethernet; the memory expansion device 220E then converts the remote device memory access request into a send host memory access request and sends the send host memory access request to the host 210E using the CXL.cache subprotocol to request access to the memory 214E of the host 210E.

Figure 4:
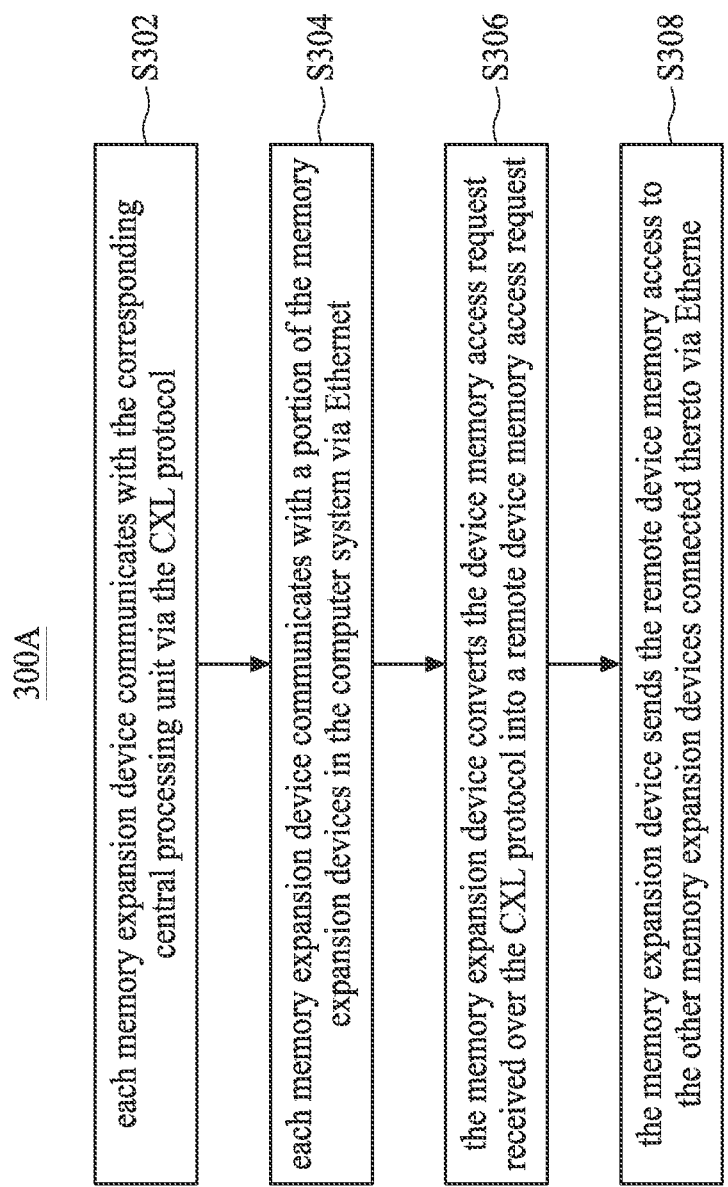
FIG. 4 is a schematic diagram illustrating a computer system according to a first embodiment of the present application.
Figure 5:
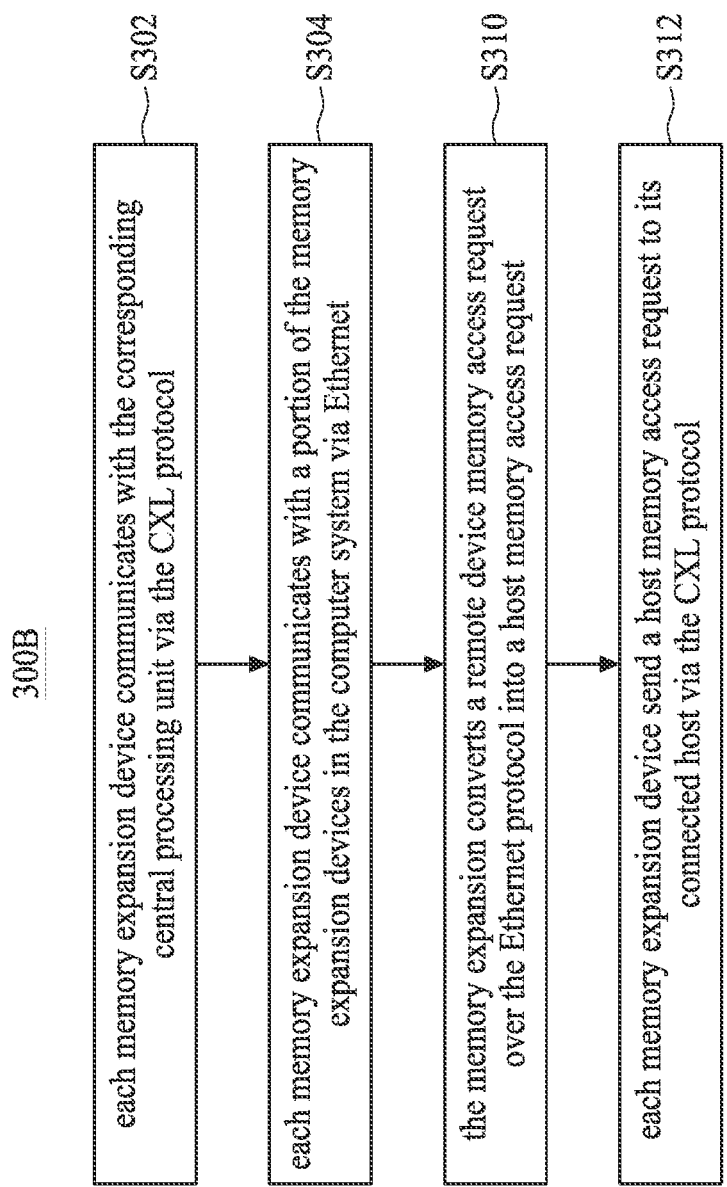
FIG. 5 is a schematic diagram illustrating a computer system according to a second embodiment of the present application.

FIG. 4 FIG. 5 are respectively schematic diagrams illustrating methods for use in computer systems according to different embodiments of the present application. The computer systems in these two methods 300A and 300B for use in a computer system include a computer system 20 including a plurality of hosts and a plurality of memory expansion devices, and each host includes a central processing unit and a memory. The method 300A for use in the computer system may include Steps S302, S304, S306, and S308, and the method 300B for use in the computer system may include Steps S302, S304, S310, and S312S308. In Step S302 of FIG. 4 and FIG. 5, each memory expansion device communicates with the corresponding central processing unit via the CXL protocol, whereas in Step S304, each memory expansion device communicates with a portion of the memory expansion devices in the computer system via Ethernet so that any two memory expansion devices can communicate with each other via at least two different paths, and at least one of said two paths passes through no more than one memory expansion device, thereby allowing all central processing units in the computer system to achieve full connectivity of the memory expansion devices within one hop.

After completing the connection between the host and the memory expansion device and the connection between the memory expansion devices, there are different operations depending on whether the memory expansion device is connected to the host that performs the target task. Referring to FIG. 4, the memory expansion device connected to the host performing the target task receives a device memory access request sent by the central processing unit via the CXL.mem subprotocol in the CXL protocol (Step S306); this memory expansion device then converts the device memory access request into a remote device memory access request and sends it to the other memory expansion devices connected thereto via Ethernet (Step S308). Referring to FIG. 5, a memory expansion device that is not connected to a host performing the target task may receive a device memory access request from another memory expansion device over the Ethernet protocol (Step S310 as shown in FIG. 5) and decide whether to send the remote device memory access request to the other memory expansion device or to convert the remote device memory access request into a host memory access request according to the information carried in the remote device memory access request (Step S310) and send a host memory access request (step S312) to its connected host via the CXL.mem subprotocol in the CXL protocol to access the memory of said host.

The foregoing outlines features of several embodiments of the present application so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer system, comprising:
    a plurality of hosts, wherein each host comprises:
        a CPU; and
        a memory; and
    a plurality of memory expansion devices, wherein the plurality of memory expansion devices correspond to the plurality of hosts in a one-to-one manner, wherein each memory expansion device comprises:
        a first interface, configured to allow each memory expansion device to communicate with the corresponding CPU via a first coherence interconnection protocol; and
        a plurality of second interfaces, configured to allow each memory expansion device to communicate with a portion of memory expansion devices of the plurality of memory expansion devices via a second coherence interconnection protocol;
    wherein any two memory expansion devices of the plurality of memory expansion devices communicate with each other via at least two different paths, and the number of memory expansion devices that at least one of the two paths passes through is not more than one, and
    wherein the CPU of a first host of the plurality of hosts is capable of accessing the memory of a second host of the plurality of hosts via the interconnected memory expansion devices that are operatively interconnected by the second coherence interconnection protocol.

2. The computer system of claim 1, wherein each memory expansion device further comprises a memory interface controller, configured to covert a device memory access request from the first interface to a remote device memory access request, and convert a remote device memory access request from the second interface to a host memory access request.

3. The computer system of claim 2, wherein the first coherence interconnection protocol is a CXL protocol, and the device memory access request conforms to CXL.mem sub-protocol of the CXL protocol.

4. The computer system of claim 2, wherein the first coherence interconnection protocol is a CXL protocol, and the host memory access request conforms to CXL.cache sub-protocol of the CXL protocol.

5. The computer system of claim 2, wherein the CPU of the first host of the plurality of hosts sends the device memory access request to a first memory expansion device corresponding to the first host, the memory interface controller of the first memory expansion device converts the device memory access request to the remote device memory access request, the first memory expansion device also sends the remote device memory access request to the second memory expansion device, the memory interface controller of the second memory expansion device converts the remote device memory access request to the host memory access request, the second memory expansion device also sends the host memory access request to the CPU of the second host of the plurality of hosts, so as to access the memory of the second host.

6. The computer system of claim 2, wherein the CPU of the first host of the plurality of hosts sends the device memory access request to a first memory expansion device corresponding to the first host, the memory interface controller of the first memory expansion device converts the device memory access request to the remote device memory access request, the first memory expansion device also sends the remote device memory access request to the second memory expansion device, the second memory expansion device forwards the remote device memory access request to a third memory expansion device, the memory interface controller of the third memory expansion device converts the remote device memory access request to the host memory access request, the third memory expansion device also sends the host memory access request to the CPU of a third host of the plurality of hosts, so as to access the memory of the third host.

7. The computer system of claim 2, wherein each memory expansion device further comprises a one-hop switch, coupled between the plurality of second interfaces and the memory interface controller, wherein when each memory expansion device receives the remote device memory access request from one of the plurality of second interfaces, the one-hop switch configured to selectively transfer the remote device memory access request to the memory interface controller, or sends out the remote device memory access request via another second interface of the plurality of second interfaces.

8. The computer system of claim 1, wherein the plurality of hosts are mounted on a same rack.

9. The computer system of claim 1, wherein the plurality of memory expansion devices are implemented using FPGA.

10. The computer system of claim 7, wherein the plurality of memory expansion devices further comprise:
a packet engine, coupled between the one-hop switch and the memory interface controller.

11. The computer system of claim 1, wherein the plurality of memory expansion devices further comprises near-memory processor.

12. A memory expansion device, comprising:
the memory expansion device of the computer system of claim 1.

13. A method for use in a computer system, wherein the computer system comprises a plurality of hosts and a plurality of memory expansion devices, wherein each host comprises a CPU and a memory, wherein the plurality of memory expansion devices correspond to the plurality of hosts in a one-to-one manner, and the method comprises the steps of:
allowing each memory expansion device to communicate with the corresponding CPU via first coherence interconnection protocol; and
allowing each memory expansion device to communicate with a portion of memory expansion devices of the plurality of memory expansion devices via a second coherence interconnection protocol, wherein any two memory expansion devices of the plurality of memory expansion devices communicate with each other via at least two different paths, and the number of memory expansion devices that at least one of the two paths passes through is not more than one,
wherein the CPU of a first host of the plurality of hosts is capable of accessing the memory of a second host of the plurality of hosts via the interconnected memory expansion devices.

14. The method of claim 13, further comprising the step of:
allowing each memory expansion device to covert a device memory access request via the first coherence interconnection protocol to a remote device memory access request, and convert a remote device memory access request received via second coherence interconnection protocol to a host memory access request.

15. The method of claim 14, wherein the first coherence interconnection protocol is a CXL protocol, and the device memory access request conforms to CXL.mem sub-protocol of the CXL protocol.

16. The method of claim 14, wherein the first coherence interconnection protocol is a CXL protocol, and the host memory access request conforms to CXL.cache sub-protocol of the CXL protocol.

17. The method of claim 14, further comprising the steps of:
allowing the CPU of the first host of the plurality of hosts to send the device memory access request to a first memory expansion device corresponding to the first host;
allowing the memory interface controller of the first memory expansion device to convert the device memory access request to the remote device memory access request;
allowing the first memory expansion device to send the remote device memory access request to the second memory expansion device;
allowing the memory interface controller of the second memory expansion device to convert the remote device memory access request to the host memory access request; and allowing the second memory expansion device to send the host memory access request to the CPU of the second host of the plurality of hosts, so as to access the memory of the second host.

18. The method of claim 14, further comprising:

allowing the CPU of the first host of the plurality of hosts to send the device memory access request to a first memory expansion device corresponding to the first host;

allowing the memory interface controller of the first memory expansion device to convert the device memory access request to the remote device memory access request;

allowing the first memory expansion device to send the remote device memory access request to the second memory expansion device;

allowing the second memory expansion device to forward the remote device memory access request to a third memory expansion device;

allowing the memory interface controller of the third memory expansion device to convert the remote device memory access request to the host memory access request; and allowing the third memory expansion device to send the host memory access request to the CPU of a third host of the plurality of hosts, so as to access the memory of the third host.

19. The method of claim 14, further comprising the step of:

when each memory expansion device receives the remote device memory access request, allowing each memory expansion device selectively to convert the remote device memory access request to the host memory access request, or send the remote device memory access request to another memory expansion device of the plurality of memory expansion devices via a second coherence interconnection protocol.

\* \* \* \* \*